US008989552B2

(12) United States Patent
Slotte

(10) Patent No.: US 8,989,552 B2
(45) Date of Patent: Mar. 24, 2015

(54) MULTI DEVICE AUDIO CAPTURE

(75) Inventor: Benedict Slotte, Turku (FI)

(73) Assignee: Nokia Corporation, Espoo (FI)

(*) Notice: Subject to any disclaimer, the term of this patent is extended or adjusted under 35 U.S.C. 154(b) by 63 days.

(21) Appl. No.: 13/588,373

(22) Filed: Aug. 17, 2012

(65) Prior Publication Data

US 2014/0050454 A1 Feb. 20, 2014

(51) Int. Cl.
*H04N 5/935* (2006.01)
*H04N 5/93* (2006.01)
*H04N 5/92* (2006.01)

(52) U.S. Cl.
USPC ............................ 386/201; 386/279; 386/339

(58) Field of Classification Search
None
See application file for complete search history.

(56) References Cited

U.S. PATENT DOCUMENTS

2008/0207123 A1* 8/2008 Andersen ..................... 455/41.1
2010/0105325 A1* 4/2010 Halla et al. ................... 455/41.2
2010/0119072 A1* 5/2010 Ojanpera ........................ 381/17
2012/0128160 A1* 5/2012 Kim et al. ........................ 381/17
2013/0044894 A1* 2/2013 Samsudin et al. .............. 381/92

* cited by examiner

*Primary Examiner* — Thai Tran
*Assistant Examiner* — Stephen Smith
(74) *Attorney, Agent, or Firm* — Harrington & Smith

(57) ABSTRACT

At a master device are registered one or more other devices associated with one or more audio channels for recording at least one acoustic signal from one or more sound sources. The at least one acoustic signal is recorded using at least one of the master device and one or more other devices, and the at least one recorded acoustic signal is either collected by at least one of the master device and the one or more other devices, or transmitted to another entity by at least one of the master device and the one or more other devices. In the examples the registration assigns audio and/or video channels to different microphones of the different devices. In one embodiment these different recordings are mixed at the master device and in another they are mixed at a web server into a multi-channel audio/sound (or audio-video) file.

18 Claims, 5 Drawing Sheets

MULTI DEVICE AUDIO CAPTURE

TECHNICAL FIELD

The exemplary and non-limiting embodiments of this invention relate generally to recording and/or compiling multichannel audio and possibly also multichannel video at a user mobile radio device such as a mobile terminal/smartphone, and the specific examples include stereo and multichannel (5.1) formats including surround audio and stereo video capture.

BACKGROUND

While it is known for mobile terminals to have the capacity to record audio, the generally small size of typical mobile devices presents challenges for such capture, particularly capture of multichannel audio. Where such a mobile user device has multiple microphones, one reason that it is difficult to achieve a subjectively good sonic image is that all microphones are necessarily spaced apart by a distance no larger than the size of the device itself, with typically spacing in the range of about 5-15 cm. For a subjectively good and spacious-sounding audio recording, it is generally preferred that at least some of the microphones be spaced apart (in more than one direction) by up to several meters. This is especially true if the microphones are omnidirectional rather than directional. If all microphones are spaced close together as they must be when on a single mobile terminal, the end result usually suffers from one or more of the following artifacts:

- Poor envelopment and spaciousness. The result of this is that the recording does not sound like the acoustic space it was recorded in, and to restore some of this impression, additional processing must be employed.
- Lower signal-to-noise ratio. This is because more extensive processing of the microphone signals may be needed, for example, to artificially generate directivity in spite of the fact that the actual microphones are omnidirectional.
- Possible artifacts from steering algorithms. Steering algorithms may have to be employed in order to achieve a reasonable separation between channels. Artifacts may arise, for example, when multiple sound sources are spread around in several directions and sounding at the same time.
- Low flexibility. This arises from the fixed positioning of the microphones; algorithms can be employed to alter the directional patterns, delays etc., but only within reasonable limits.
- Further processing artifacts for example from channel de-correlation during digital signal processing.
- Heavier processor load, due to the additional processing needed.

For proper surround sound capture the mobile user device would need to be equipped with at minimum three distinct microphones. Related teachings concerning multi-channel audio may be seen at commonly assigned U.S. patent application Ser. No. 12/291,457 by Juha P. Ojanpera, filed on Nov. 10, 2008 and entitled Apparatus and Method for Generating a Multichannel Signal.

Regarding capture of 3-dimensional video, at least some of the same limitations apply. Normally, one would use two cameras to capture stereo video, one camera for each eye. But the optimum distance between cameras (termed the stereo base) is dependent on the distances to the nearest and farthest points of the scene to be captured, and also on the captured angle (wideangle, normal, or short telephoto). Also the stereo base depends on the desired apparent depth of the resulting 3D video. The end result for stereo video is that typically the best stereo base is larger than can be accommodated by the maximum size of a typical mobile device. From an economic rather than a technical perspective, installing multiple cameras in a mobile user device adds to the cost and to its bulk.

SUMMARY

According to a first exemplary aspect the invention there is a method comprising: registering at a master device one or more other devices associated with one or more audio channels for recording at least one acoustic signal from one or more sound sources; recording the at least one acoustic signal using at least one of the master device and one or more other devices, wherein the at least one recorded acoustic signal is either collected by at least one of the master device and the one or more other devices, or transmitted to another entity by at least one of the master device and the one or more other devices.

According to a second exemplary aspect the invention there is an apparatus comprising at least one processor; and a memory storing a program of computer instructions. In this embodiment the processor is configured with the memory and the program to cause an apparatus to: register at a master device one or more other devices associated with one or more audio channels for recording at least one acoustic signal from one or more sound sources; record the at least one acoustic signal using at least one of the master device and one or more other devices, wherein the at least one recorded acoustic signal is either collected by at least one of the master device and the one or more other devices, or transmitted to another entity by at least one of the master device and the one or more other devices.

According to a third exemplary aspect the invention there is a memory storing computer readable instructions which when executed by at least one processor result in actions comprising: registering at a master device one or more other devices associated with one or more audio channels for recording at least one acoustic signal from one or more sound sources; recording the at least one acoustic signal using at least one of the master device and one or more other devices, wherein the at least one recorded acoustic signal is either collected by at least one of the master device and the one or more other devices, or transmitted to another entity by at least one of the master device and the one or more other devices.

These and other aspects are detailed further below.

DETAILED DESCRIPTION

The exemplary and non-limiting embodiments detailed below present a way for recording multi-channel audio using multiple distinct user devices, each recording different channels to capture the at least one acoustic signal which are then combined at some centralized entity into a unitary multi-channel audio file. In the examples below the devices are mobile terminals such as smart phones, but this is a non-limiting implementation and the term user device or mobile user device is a more generic rendition of the individual devices. In one embodiments the centralized entity at which the individual audio channels from multiple devices are combined may be an internet based server in one of the device user's 'cloud' computing architecture, and in another embodiment one of the individual recording devices acts as master and collects and compiles the various channel-specific recordings from the other devices. Similar principles can be used for assembling 3-dimensional (3D) video.

The above general concepts may be implemented as an application and hardware that allows the several distinct mobile devices to be configured to make a synchronized stereo/multichannel recording together, in which each participating device contributes one or more channels via a wireless connection. In a similar fashion, a 3D video recording can be made with a stereo base that is much larger than the maximum dimensions of any one of the individual devices, which is typically no more than about 15 cm. Any two participating devices that are spaced sufficiently far apart could be configured to provide the 3D video.

In this embodiment the application handles the initial setup, data transfer both during and/or after capture of the audio or video channels/components, and in one particular embodiment the application at the master device also handles the final mixing of the resulting recording. The application could run on the devices only, or in another embodiment there may be also a companion application on a web server to give the users options for processing and upload/download. Such a web-based companion application could also function as a gallery where users can share recordings with others, or store them for downloading at another time.

Figure 1:
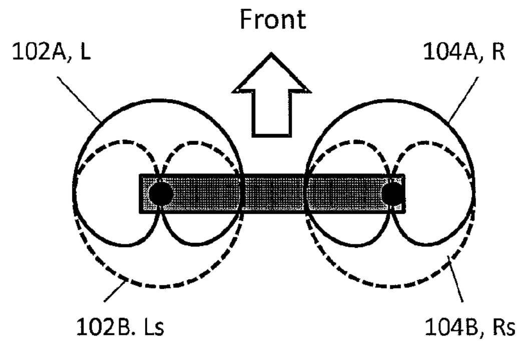
FIG. 1 illustrates a single-device arrangement for capturing a surround sound recording using multiple microphones of a user mobile device and assuming cardioid polar patterns.

Before exploring further details of the exemplary embodiments, first consider the inherent limitations of utilizing a single mobile terminal for recording multi-channel audio as is detailed with respect to FIG. 1. Normally when a surround recording is made using a single device, a minimum of three microphones are used to synthesize directional polar patterns. The actual microphones, together with the algorithms used to synthesize the directional polar patterns, in effect give rise to a set of "virtual" microphones. Normally, the actual microphones might be omnidirectional, but the virtual microphones might have some other polar pattern (e.g. a directional polar pattern such as a cardioid). Note that the polar patterns in the illustration at FIG. 1 are non-angled cardioids. In the descriptions of microphone arrangements below, it should be understood that the polar patterns of the actual microphones are less relevant, but what primarily matters is the arrangement of the virtual microphones and their polar patterns, as synthesized by the various digital signal processing (DSP) algorithms used for surround audio capture. Thus "polar pattern" hereafter can refer to the "virtual polar pattern" or to the "actual polar pattern", and "microphone" can refer to the "virtual microphone" or to the "actual microphone", unless either of the more specific terms is used explicitly. FIG. 1 shows a device that has four "virtual microphones" synthesized from three actual microphones (not shown), each virtual microphone defining only one of the illustrated virtual polar patterns 102A (solid line), 102B (dashed line), 104A (solid line), 104B (dashed line). The polar patterns are shown as cardioids for simplicity, but they might as well be something else than cardioids, and they could be angled differently, and the polar patterns could depend on frequency, and also the polar patterns could vary dynamically over time (depending, in effect, on additional steering algorithms reacting to the distribution of sound sources around the device). Furthermore, it should be understood that the actual microphones may also themselves be directional (having e.g. figure-8 or cardioid polar patterns), and no "virtual polar patterns" need to be generated.

The relevant point of FIG. 1 is that there is very little spatial separation between the virtual left (L, polar pattern 102A) and left surround (Ls, polar pattern 102B) microphones, and likewise between the right (R, polar pattern 104A) and right surround (Rs, polar pattern 104B), microphones. The spatial separation between the left and right virtual microphones 102A, 104A, and between the left and right virtual surround microphones 102B, 104B, is also small.

Figure 2:
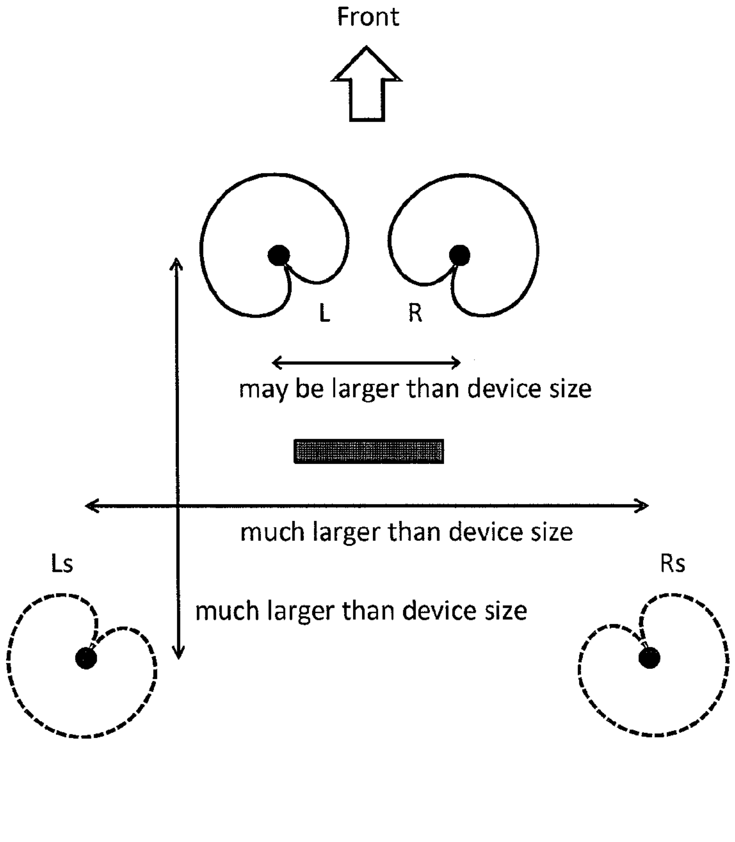
FIG. 2 is a schematic diagram illustrating more suitable spacing of microphones for a surround sound recording, and for comparison also is shown a typical mobile device for size comparison purposes.

FIG. 2 shows the same single device as FIG. 1 superposed on an arrangement of four cardioid microphones, as would be used for a live surround recording. There are very many other good placements but the principal point of FIG. 2 is to show that the spatial separation of the microphones, sometimes by a much larger distance than the size of a mobile user device, can provide a subjectively more pleasing result with less processing and therefore fewer artifacts. The main reason for this positive result is the naturally lower correlation between front and rear channels, and mutually between rear (surround) channels. This is why live surround recording (outside the realm of mobile devices) usually employs microphones spaced apart by much more than the size of a typical mobile device.

Figure 3:
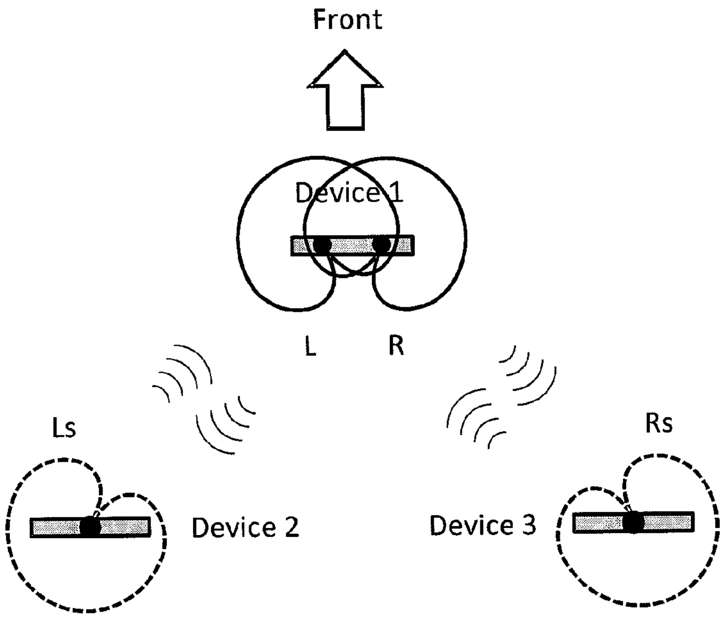
FIG. 3 is an arrangement of three different mobile devices arranged to capture different audio channels and spaced along more optimal distances according to an exemplary embodiment of these teachings.

FIG. 3 illustrates three user devices engaged in a common recording of an acoustic signal, and spatially disposed relative to one another so as to realize a microphone setup somewhat similar to that shown at FIG. 2. Optionally, the center device 1 can also simultaneously record video, or the left and right surround devices 2 and 3 can record stereo video. The center device 1 is operating in this example as the master device, meaning the other devices are slaved in time or synchronized to the master device. There may of course be a different number than three devices as shown at FIG. 3; there may be only two devices or there may be four or five devices participating to record channel components of the resulting surround sound audio file (each device assumed to record one channel L, R, C, Ls or Rs). There may also be more than five participating devices. This could be the case if some setup using more channels than standard 5.1 surround is used, or if more than one device is recording some given channel. The microphones in each device may also use a different polar pattern or angling.

Note that the exemplary recording system shown at FIG. 3 has three devices recording the acoustic signal using a total of four distinct channels. Specifically, the master device 1 records two channels on two different microphones. In other embodiments each device may have only one microphone recording a different one of the various channels. If for example there were a fourth device, or the device 1 of FIGS. 3-4 had a third microphone, the microphone of the fourth device (or the third microphone of device 1) could be assigned for a center channel C between the L and R channels. In order that a single software application installed identically in all of the various devices 1, 2, 3 can accommodate any of these various multi-channel recording arrangements, the user display can offer the user various options such as choosing which channel or channels is/are to be recorded at the individual device, and an indication whether the individual device will be acting as master device which will compile the variously recorded channels into a multi-channel surround sound audio file. These and other options are detailed further below with respect to FIG. 4.

Now consider the requirements of the various devices which engage in the recording and file compiling. In the hardware regime such participating devices need to have at the minimum at least one microphone and some means of bidirectional wireless data transfer to another device. This wireless transfer should have sufficient bitrate and be reliable over distances of at least a couple of meters. Initial setup is done by registering the participating devices with one designated "master" device. As one non-limiting example, the initial setup registration could be handled using near field communications or using Bluetooth, while the data transfer itself could be handled using Bluetooth.

Further hardware requirements will depend on the specific implementation of these teachings which is operating the device. For example, in one implementation each participating device stores the audio channel(s) it is recording in its own memory; and the master device only provides synchronization. In this case the hardware requirements for memory on a participating device are more extensive than an implementation where each of the 'slave' participating devices transfers its captured audio data to the 'master' device in real time. In this latter implementation the master device stores the final (multi-channel) recording so the hardware memory requirements for the master device are much larger than the slave devices which need only buffer enough of their own captured data file for transmission. In a further implementation the memory requirements for all participating devices, slave and master, are more closely aligned where each sends its own recorded acoustic signal (channel or channels) to a web server in real time (or each records the whole audio file and uploads it after the entire audio data is captured). In this case also the master device provides synchronization to the other slave devices. And of course the implementation in which the master device is also compiling the multiple individually recorded acoustic signals (channel-specific audio files) into one multi-channel audio file will require a greater processing capacity than the master device in the other implementations.

The various participating devices do not need to be of the same type. In one preferred arrangement the device that is recording the front channels is equipped with three or more (actual) microphones (to enable algorithms to synthesize at least two properly angled directional virtual microphones), and the other devices may have only one or two (actual) microphones but without any support for surround audio capture. There will be inevitable frequency response and level differences between the devices if they are not all of the same model, but these may be corrected automatically by the software application during mixing of the final multi-channel recording. In one specific but non-limiting implementation, this may be implemented as a lookup table stored in the device's memory (or on a web server, if that is where the final recording is mixed) which contains parametric equalizer parameters for different ones of the known device models.

Continuing with the device hardware requirements, of course if 3D video is what is to be ultimately compiled then at least two of the participating devices must have cameras. These cameras need not be of the same type since it is possible to align video images as an automatic post-processing step after the recording has already been captured by the individual cameras. Such alignment is needed anyway because any two users holding the devices capturing video will not be able to always point them in precisely the same direction.

Now consider the software requirements for these non-limiting embodiments. Assume for example that the initial setup is handled by starting an implementing application in the devices in question. A given audio channel (or combination of channels) is contributed by one or more other devices that have been registered, by near field communication or Bluetooth for example, in this application to be the providers of this audio data.

Figure 4:
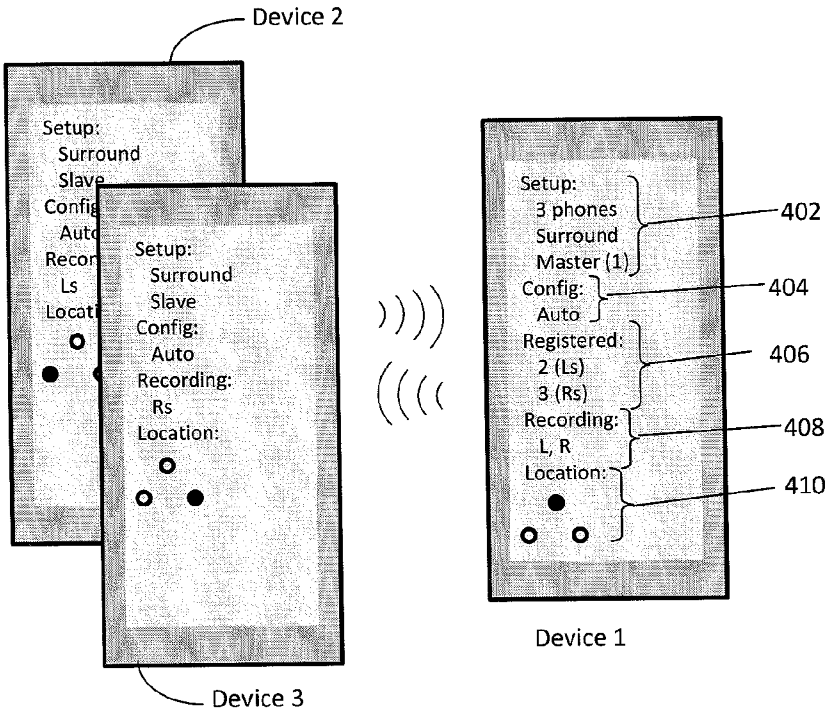
FIG. 4 shows graphical user interfaces of the devices shown at FIG. 3 during an initial setup of the joint audio recording using a software application resident in the memory of each such device.

FIG. 4 in general illustrates an example of configuring a common recording by engaging the recording application in all three devices, and letting the "slave" devices register themselves (for example, via near field communications or Bluetooth) with the chosen master device. After this, the devices can stay connected such as via Bluetooth. In one particularly automated and user-friendly case, one device user simply has to choose to be "master", and the other users just have to bring their devices close to the "master" device, at which point they will be automatically assigned a recording channel and also show their users where they should stand in relation to the "master". In a variation of this user-friendly case the different users indicate the relative position at which they are located and the software application assigns the respective channels for recording based on those relative positions. In both cases the graphical user interface on the master device, or on all devices, can visually display the relative location of any given device with respect to the master. For example, the master device may display a map of all participating devices and the non-master participating devices may display that same map or only the relative location of only the particular device in relation to the master device. After this, the "master" device user can start the recording. In this context slave and master refer to synchronization; the slave devices synchronize to a clock signal sent by the master.

The synchronization allows the recordings by the different devices of the acoustic signal to be done simultaneously, or nearly so. True time alignment of the various recorded signals may be done after the recordings are complete, during the mixing phase. Substantially in the above context accounts for the fact that the differently positioned microphones and devices may receive the acoustic (or audio-video) signal they are recording at slightly different times due to different propagation pathways of the signal, even if only a fraction of a millisecond different. The time delay inherent in signal propagation delay due to the spacing of the microphones/devices should be preserved in the end-result multi-channel sound file but the mixing phase can eliminate extraneous time delay due to non-synchronization of the different devices themselves. This may arise for example due to clock drift, if there is a large time delay from the master device's synchronization signal and the start of recording the acoustic signal or if such clock drift develops while the recording is ongoing. Of course the above examples assume for simplicity there is one acoustic signal being recorded by the multiple devices but the same principles apply if there are multiple acoustic (or multiple audio-video) signals from one or more audio (or audiovisual) sources. In all cases it is the acoustic/sonic (or acoustic-visual) environment which the devices are recording.

FIG. 4 illustrates one non-limiting embodiment of the graphical user interface of three devices showing an initial setup screen 11 on the devices' graphical user interfaces. The following description will refer to that of the master device 10 with the setup screen of the slave devices being similar except where described otherwise. There is a device setup field 402 which for the master device 1 tells how many total devices are participating in the system, but as shown for the slave device 2 there need not be a similar total number of devices shown on the user display setup screen. The setup screen 11 further in the setup field 402 shows that the resulting audio file is to be a surround sound, and indicates the status of the device itself whether slave or master.

The initial setup screen 11 could also display a configuration field 404 telling how the devices are configured for the channel they are to record, either manually or automatically. For at least the master device there is a participating device channel field 406 which lists all other devices which are registered along with the channels they are assigned for recording, and for all devices there is a recording channel field 408 which tells which channel or channels that particular device will be recording.

In one relatively simple embodiment the implementing software application randomly assigns channels to the registered devices (which are displayed at the participating device channel field 406 and the recording channel field 408), and then directs the users to stand in suitable positions in relation to the other participating devices. For example, if a device is randomly chosen to record the left surround Ls channel (device 2 at FIGS. 3-4), the application tells the user to stand to the left behind the person(s) recording the front channels. This is shown at FIG. 4 by a relative location field 410, which is in that embodiment a graphical representation of the participating devices in the proper spatial arrangement. In a similar fashion, if 3D video is chosen, the application directs the users whose devices are capturing left and right video channels to stand next to each other and indicates which is to be on the left and which is to be on the right.

As noted above, the channel assignments may instead be made after the users input their relative locations, for example device 2 of FIGS. 3-4 indicates it is positioned to the left and rear of device 1. The implementing software then chooses device 1 as the master device which will in this example record the front channels L and R, chooses device 2 to record channel Ls, and device 3 to record channel Rs. Or the participating persons can manually designate which will be the master device. Unlike the embodiment above the channel selection is not random, but the graphical display after channel assignment can be similar to that described above for FIG. 4 as confirmation to the different users of the relative position at which he/she should remain during the course of the recording.

In a more advanced mode, the implementing software application could let the users manually select the channels being recorded by a particular device (such as "left" or "right" for stereo, and additionally "left surround", "right surround" and possibly "center" for surround capture) which are displayed at the recording channel field 408. In this case the implementing software application automatically chooses the suitable microphone configurations. For example, if as in FIG. 4 the device 2 is chosen to record the left surround Ls channel, it could automatically use a directional polar pattern that is aimed to the rear left as shown at FIG. 3 when the device 2 is held with its camera pointing at the subject whose location is in the direction of the "Front" arrow shown at FIG. 3 (such as for example the stage in a concert venue). In addition the application could also tell the user to stand to the left behind the person(s) recording the front channels, such as via a graphical relative location field 410 as shown at FIG. 4. Alternatively, for even more experienced and/or creative users, the application could allow the user to define any desired microphone configuration. Typically the choices would be omni-directional, and directional facing in a few optional directions, but these are non-limiting examples. If the devices lack the ability to use directional polar patterns (for example, if each contains only one actual omnidirectional microphone or if its multiple microphones are not conveniently placed), then they would just record as omni-directional microphones.

There are multiple other implementations for deciding which microphone/device is recording which channel. In one implementation, the various devices report to the master device or central server their physical location with the audio channel file they are uploading and the entity which compiles these single-channel files into a surround sound file allocates to a given single-channel audio file one of the respective channels (L, R, Ls, Rs, etc.) based on the position of the devices relative to one another which it derives from the reported physical locations. In another implementation the association of a channel with an audio file is made manually at the individual devices by the users, or alternatively all such channel associations are made manually by the user of the master devices once all of the participating devices are registered to the master. In a still further implementation the various devices sense their position relative to one another, such as via device-to-device type communications or a conventional Bluetooth link, and based on that relative position automatically attribute the channel identification to the single-channel audio file recorded at a given device or microphone. And in a further embodiment the channel name (for example L, R, C, Ls, Rs) is added by the implementing software to each of the uploaded single-channel audio files themselves, such as for example in a file name or in metadata or in a header of the file uploading message, and the compiling entity uses those channel names when compiling the various single-channel audio files into one.

Each of the above aspects of these teachings may be similarly applied when the application is being setup to capture a video file to be compiled with other such video files captured by the cameras of other devices into a 3-D video file. Or in another embodiment the acoustic signal is recorded using multiple channels and its associated video signal is captured using only one channel.

Figure 5:
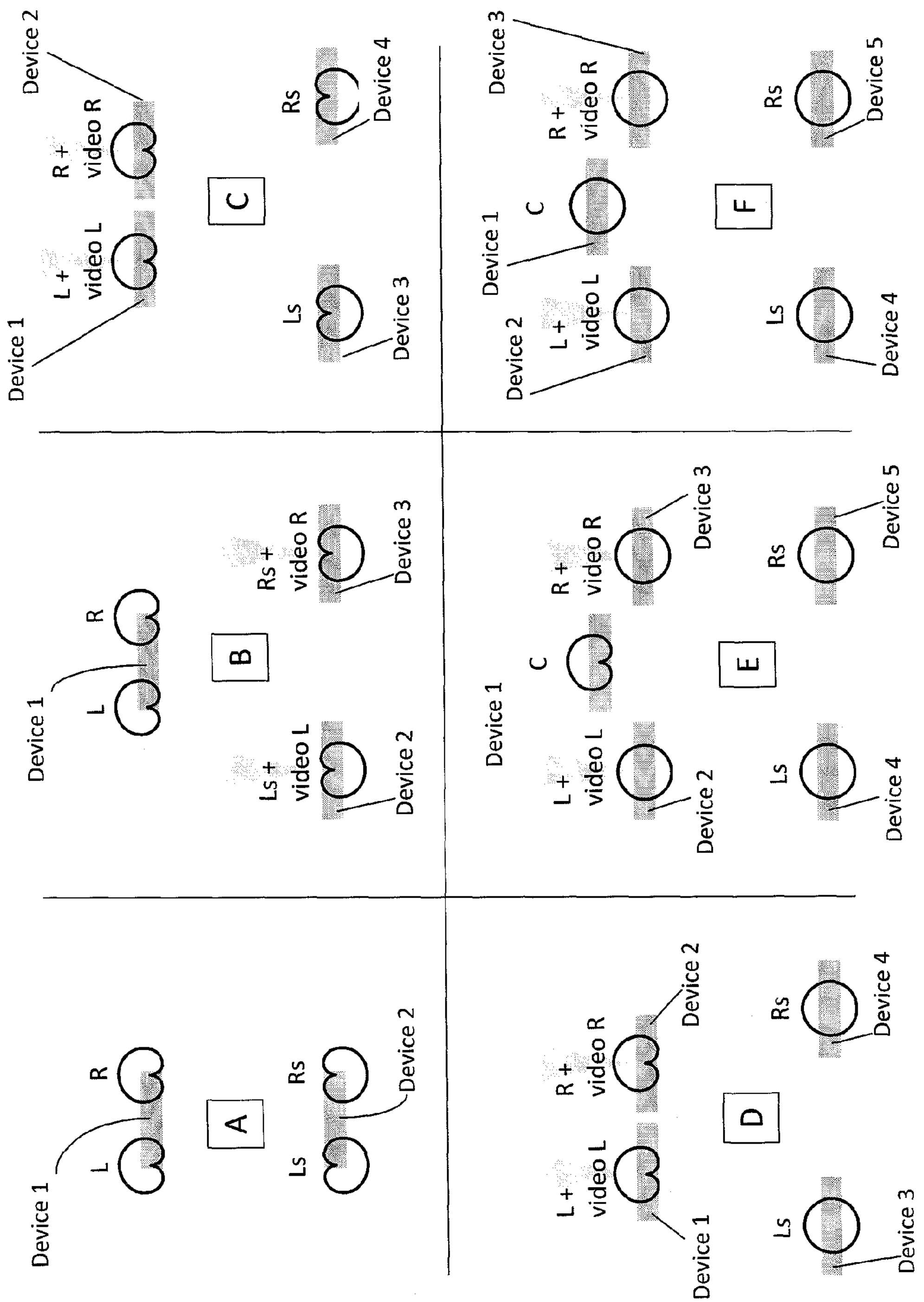
FIGS. 5A-F each illustrate a different setup of devices for capturing a surround sound audio recording and in some case also a 3D video recording and shows some non-limiting examples of the flexibility offered by these teachings.

FIG. 5 has panels A through F and showing various different examples of how two or more devices could be used to make a surround sound (and 3D video) recording using the techniques detailed above. In each of Figures A-F, "front" is in the upward direction, same as is illustrated by an explicit arrow at FIGS. 1-3. FIG. 5A illustrates a simple setup in which there are only two participating devices; device 1 is used to record the front channels L, R, and device 2 is used to record the rear channels Ls, Rs. FIG. 5B illustrates three participating devices arranged as in FIG. 3; device 1 records front L and R audio channels, device 2 records rear audio channel Ls and video channel L, and device 3 records rear audio channel Rs and video channel R. FIG. 5C illustrates four participating devices; device 1 records front L audio channel and left video channel L, device 2 records front audio channel R and right video channel R, device 3 records rear audio channel Ls, and device 4 records rear audio channel Rs. In each of FIGS. 5A-C all of the audio channels are recorded with a directional polar pattern as shown.

FIG. 5D is similar to FIG. 5C device 3 records rear audio channel Ls using an omni-directional microphone, and device 4 records rear audio channel Rs also using an omni-directional microphone. FIG. 5E illustrates fiver participating devices; device 1 records center channel audio C, device 2 records front L audio channel with an omni-directional microphone and left video channel L, device 3 records front audio channel R with an omni-directional microphone and right video channel R, device 4 records rear audio channel Ls with a polarized microphone, and device 5 records rear audio channel Rs also with a polarized microphone. FIG. 5F is similar to FIG. 5E except all audio channels are recorded with omni-directional microphones.

In FIGS. 5A-F, devices that are shown close to each other would typically be spaced apart by about 0.5 to about 1.0 meters, and devices that are shown further away from each other would normally be spaced apart by about 1.5 to about 3.0 meters. This spacing is merely a suggestion since subjective quality in the end result compiled recording is partially a matter of taste, but even only roughly near the above device spacing will provide in many cases a significant improvement over surround capture by a single device. The arrangements of FIG. 5 are exemplary and are not intended to be comprehensive but rather serve as various examples of the possibilities. For example, the polar patterns of the virtual microphones could be angled away from the frontal or rear direction, the polar patterns could be something else than omni-directional or cardioid, etc. The implementing software application can of course restrict the choices to the most reasonable ones, since most users will not be technically versed in the different multi-channel recording techniques and thus may be confused by too many options.

After the various audio/video files are captured at the different devices, there are similarly several different implementations for mixing or compiling of the final recording, which may or may not include one or two video channels. These relate directly to the various different setups described above.

Specifically, for the case in which each participating device stores the file it captures and during the recording phase the master is only used for synchronization, the individual stored audio and/or video data can be transferred at any convenient time after the recording. In this case the user could either upload its data for the captured channel(s) to the master device itself, or to a web server which in an embodiment may identify audio data belonging to a given recording by some metadata assigned by the master device when the capture starts.

For the case in which each slave device transfers the captured audio/video data to the master device in real time, the application on the master device could mix the final recording if the master device user so desires. Or alternatively the mixing could be handled by a web application to which the master device user uploads the channel-specific audio data that the master device captured itself and also that it collected from the slave devices. In the case of 3D video, for the current state of mobile processing power a web application is more practical implementation due to the high processing load required to align two video channels. As processing capacity increases the master device may be a more viable candidate for video compiling in the future.

For the case in which all of the devices, master and slaves, transfer their channel-specific captured audio/video data to a web server, the web-based implementing software application starts mixing the different audio and video data as soon as each device has stopped capturing for a given recording, and the web server/software application sends a notification to the participating devices once it has the final recording ready for download.

There are various different techniques by which the different files may be mixed/compiled. Mixing the audio portion of the different channel files generally will include the following.

A. Convert sample rates and bit depths, if they differ (this is more likely to occur if all the participating devices are not of the same type).

B. Correct level and frequency response differences in the audio tracks. This may be needed also if all participating devices are not of the same model. In this case, the most failsafe solution is to use a lookup table containing parametric equalizer and gain parameters for each known model of device, which makes the correction automatic and completely transparent to the users. Parameters for new devices could be provided by each update to the software application. Some general algorithm can be used in the alternative, but this is more likely to result in unwanted artifacts.

C. Adjust levels of each channel further, to achieve the most pleasing mix. This can be done when the audio capture setup is known. Knowledge about the setup is obtained in the very beginning when the various devices register themselves with the master device, as detailed above with reference to FIG. 4 which illustrated a setup where one stereo audio track was to be recorded by the master device 1 for the front channels, and two mono audio tracks were to be recorded by two additional devices 2 and 3 for the rear channels.

D. Assemble the final recording by combining the audio tracks. In the example mentioned immediately above for the setup shown at FIG. 4, the channels L and R would be taken from the audio track recorded by the master device 1, and the Ls and Rs channels would be the audio tracks recorded by the additional two devices 2 and 3, respectively.

Additional post-processing such as for example adding more reverberation, equalizing, etc. may also be done by the implementing software application, and enabled by providing further user-defined options.

Mixing the video portion of the different channel files into a 3D video will generally include the following.

A. The video frames have to be mutually rotated, scaled and aligned vertically, so that all corresponding features have the same (or approximately the same) vertical coordinate in the "left eye" and "right eye" video channels.

B. In the case where the different cameras are different types, some distortion correction also should be performed. Similar to the audio corrections described above, this can be easily handled by a lookup table containing distortion parameters.

C. The offset in the horizontal direction can be adjusted by aligning some specific feature(s) in the different video files. One convenient solution for this is to choose the nearest object as the basis for alignment, so the mixed stereo video image always extends into the display, and the nearest objects appear to be in the same plane as the display. Typically this results in a pleasant and convenient way of rendering 3D video. Finding the nearest object can be done automatically using pattern recognition techniques (for example, by comparing the parallaxes of various parts of the captured scene).

One disadvantage of close microphone spacing is that at the lowest frequencies, one can no longer achieve a high channel separation without increasing noise. Thus the sonic image becomes more and more monophonic at low frequencies. This significantly reduces the perceived spaciousness of the sonic image. Thus once the initial setup of the devices relative to one another is complete, the more widely spaced microphones can be used primarily for the low frequencies to widen the sonic image in that frequency range without excessive noise. It is preferable to assign the widely spaced microphones for the Ls and Rs surround channels. These channels sound fuller when there is a low inter-channel correlation between them, which is much easier to achieve if the Ls and Rs microphones are more widely spaced to begin with. There are of course many options depending on the specific number and location of microphones in any given device and in the overall system of multiple devices, which is why the application can decide which microphone pair or pairs is to favor the low frequencies after the initial channel setups. Typically the Ls and Rs channels could be used for this purpose as is shown at the specific FIG. 3 arrangement of three devices.

It is known that early reflections can improve the perceived depth and envelopment of the sonic image in a recording. For example, usually one does not want the Ls and Rs loudspeakers to be easily localizable, but this can easily happen at high frequencies, such as ambient audience noises (e.g. applause) which frequently seem to be localized too strongly at the Ls and Rs loudspeakers rather than between them, or simply seem too close. This effect also depends on the microphone technique used. To overcome or mitigate this, the implementing software application can add artificial early reflections to the surround sound capture algorithms. In practice this entails at least (a) generating artificial early reflections from the front channels and feeding them to the rear channels, and (b) generating artificial early reflections from the rear channels and feeding them to the front channels. In one implementation of the application software the level and extent of the artificial early reflections may be user-selectable, from only a few possible options. In the digital signal processing, the artificial early reflections would be realized simply as additional tapped delay lines and these artificial early reflections would also be filtered according to preference (for example, filter to attenuate the high frequencies).

The above early reflection concept can also be extended to multiple devices capturing video and a surround sound recording. For example, consider an example somewhat similar to FIG. 3; one person is recording L, C and R on device 1, and two persons standing on the sides or behind are recording Ls and Rs on device 2 and device 3 respectively. The devices 2 and 3 capturing the audio Ls and Rs channels are also capturing video. Depending on the distance to the stage, two persons standing between 0.5 and 2.0 meters from each other would provide quite a good stereo base for stereo video capture. This is because the parallax difference should be reasonable in relation to the distance to the subject, not too small and not too large, so the stereoscopic effect will neither be exaggerated nor too weak. Such a stereo base is too large to be realizable using a single mobile user device. In addition, the video images will need to be automatically aligned to maintain a stable stereo video, since the two devices (and hence, cameras) will inevitably point in slightly different directions and not be exactly stable (assuming they are handheld in this example). In cases when the cameras are pointing in completely different directions, the software application implementing the stereo video capture could disengage that video capture temporarily, and instead the mixed 3D video file will provide video from only one or the other device at those times when one camera is disengaged.

In one embodiment the implementing software would favor maximally coincident microphones for the front channels so as to result in a very well-defined and stable sonic image with a minimum of artifacts even after additional processing. Thus FIG. 3 has the L and R front channels on the same device 1. The more widely spaced microphones would then be used for the rear channels Ls and Rs so as to lower the inter-channel correlation between them and thus reduce or eliminate the need for de-correlation by digital signal processing as compared to closely spaced microphones/microphone pairs. But if needed even microphones disposed at opposite ends of the same device can still be used as the rear channels.

As mentioned above, the implementing software application may be arranged to configure the polar patterns of the respective devices to point in the correct direction. So if for example one person is recording the Ls channel, his/her device would record from the rear left direction even if the device is pointed towards the stage. The application could also include some correction of the sonic image to counteract user movement as noted below in order to achieve a more stable sonic image.

Consider as a practical example that the recording system detailed above is deployed at a concert. It is usually preferable that the sonic image remain stationary even if the user making the recording is occasionally pointing the camera in some direction other than center stage. To counteract this the implementing application can receive an input signal from a compass or accelerometers of the host device to steer the directions of the virtual polar patterns of the microphones, thus keeping the sonic image of the stereo/surround recording reasonably stable regardless of whether or not the user is “panning” or otherwise moving the host device for a different camera angle. It is also possible to take real time changes to the video angle of the video file being recorded by the camera as the correction input to rotate the audio polar pattern to counteract user movement of the whole host device. Such a video signal would over time tend to be more accurate than an accelerometer output signal. Regardless of which reference is used as the input for steering the polar pattern to counteract user movement, it may not be possible to maintain the sonic image stable for a full 360 degrees of rotation unless there are some unusually good microphone locations. But even some improvement in the sonic stabilization should flow through to the eventually compiled multi-channel audio.

From the various embodiments and implementations above it can be seen that these teachings offer certain technical effects and advantages. Specifically, the devices that are not themselves equipped to record surround audio can be used for surround recording, and so even low-cost devices can be used for this purpose. It is not necessary that all the participating devices be the same type, and in theory any number of channels can be supported if the wireless transfer capacity allows. This means that in an extreme case, one could use even a ring of e.g. more than ten devices for audio capture and a corresponding loudspeaker array for playback. Furthermore, the application could provide a mixdown of the channels in a way that is suitable for e.g. standard 5.1 surround playback, even if the original number of channels is higher than 5. Also, one or more devices could be configured to act as “spot” microphones (capturing e.g. some individual instruments or singers on stage, to make them more audible in the final mix). But of course at the other extreme there is a minimum of two participating devices. One can use any device spacing, and hence microphone spacing, that is needed to obtain a subjectively better recording. This in turn allows the microphones to potentially remain omni-directional rather than synthesize directional polar patterns by digital signal processing, which helps prevent some of the artifacts that arise from heavy signal processing. In a similar vein, since channels recorded by widely spaced microphones are naturally more de-correlated also at lower frequencies, any further processing to de-correlate these channels is not needed.

Another advantage of being able to use omni-directional polar patterns in surround recording is that this significantly reduces the effect of wind noise, which is often an issue when recording outdoor events. In general a recording made by these teachings is subjectively more pleasing as compared to a recording made by only a single mobile device, since the wider microphone spacing provides a much more spacious-sounding ambience, and is free of artifacts that are normally associated with microphone spacing that is too narrow.

Stereo (3D) video capture support is readily integrated with the multi-channel audio capture. For video, two devices spaced some 0.1 meters or more apart are needed, where the optimum inter-camera spacing depends on the distance to the object being captured on video (plus focal length, etc.).

One further particular advantage is that no expert knowledge is needed to employ the mobile devices and applications detailed herein for multi-channel surround sound and/or 3D video capture. With only some very basic instruction, typical device users will be able to record high-quality surround audio since their task is standing in the correct location and pointing their respective devices in the proper direction such as the stage in a concert/performance environment. Devices recording using omni-directional polar patterns do not even need to be pointed in any specific direction. In an extreme case, some of the devices could even be for example in the users' shirt pockets, so long as the clothing material allows enough sound pass through. For the rear surround channels, the additional high-frequency attenuation that would result from this is not necessarily an issue.

The nature of the compiled audio/video lends itself to sharing not only with the participating devices but with others via social media and the like. To simplify this, the web application which handles the mixing of the different-channel recording could at the same time serve as a portal for sharing such recordings.

Figure 6:
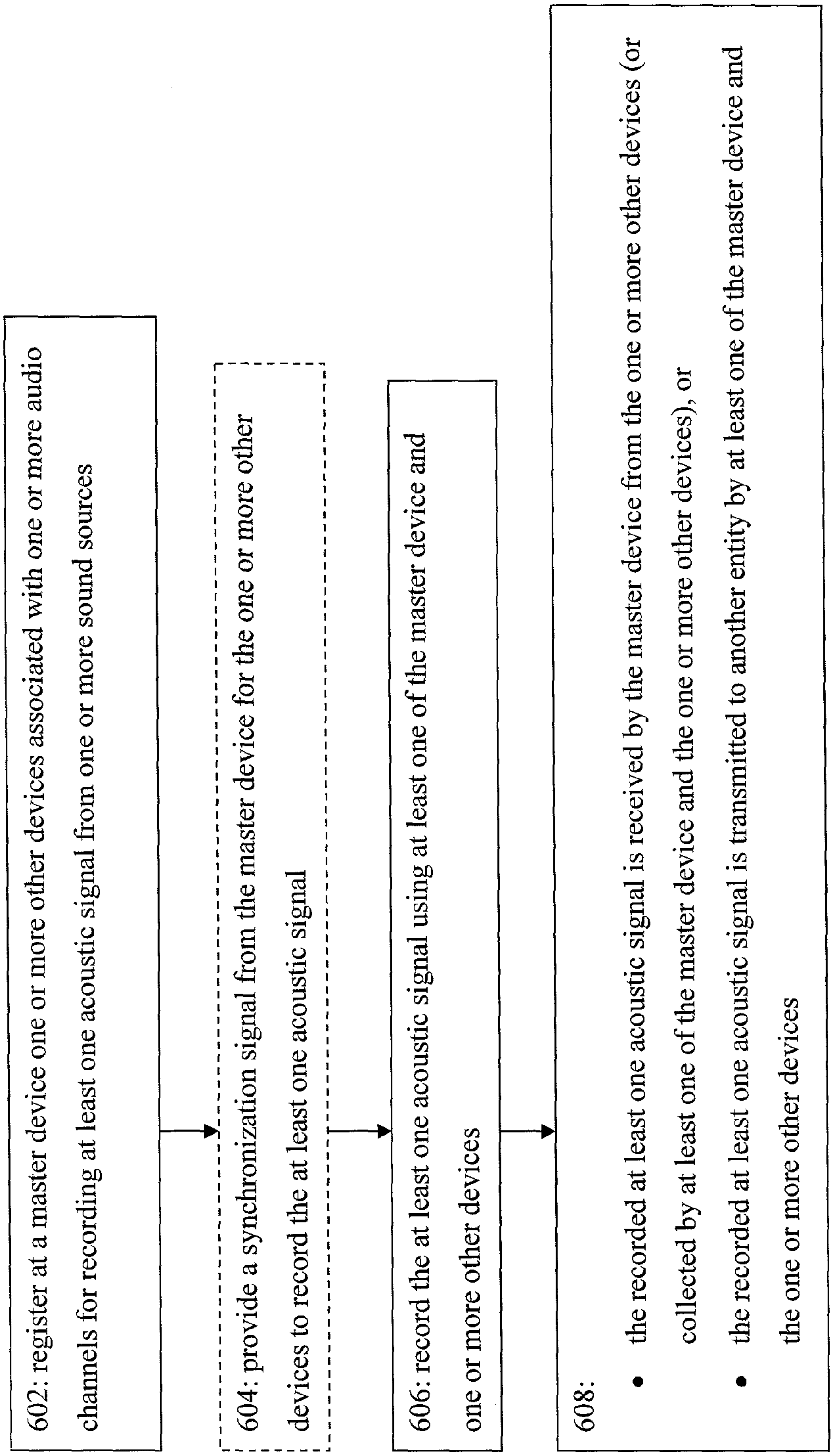
FIG. 6 is a process flow diagram illustrating a method, and actions performed at the master device, according to exemplary embodiments of these teachings.

FIG. 6 is a process flow diagram illustrating from the perspective of the master device certain but not all of the above detailed aspects of the invention. At block 602 the master device registers one or more other devices, and in some embodiments also itself, associated with one or more audio channels for recording at least one acoustic signal from one or more sound sources. In one non-limiting embodiment the master device further indicates the relative positions of the user mobile devices for recording the at least one acoustic signal. At FIG. 4 this was shown for the other devices in the participating device channel field 406, and for the master device in the recording channel field 408, all of which were indicated on the graphical user interface of the master device. In the FIG. 4 embodiment the different devices were registered automatically to the various channels simply being brought close enough to make a near field communication connection with the master device. In another embodiment the position of the other devices relative to the master device, and to one another, was used to make the channel assignments. This position could be entered manually by one or more of the users, or it may be wirelessly communicated to the master device by the various other devices.

Then continuing with FIG. 6 at optional block 604 the master device provides a synchronization signal for the one or more other devices to record their respectively registered one or more audio channels, and at block 606 the master device itself records the one or more audio channels registered to itself. This is not limited only to acoustic signals; for the case in which multi-channel video is also recorded the registration includes associating one of more of the other devices (and possibly also the master device) with one or more audio and video channels for recording different audio and video channels from the audio-video signal(s). Note that in this embodiment some devices may be registered for only one or more audio channels and other devices may be registered for only a video channel and/or other devices may be registered for both one or more audio channels and a video channel.

Block 608 provides two alternatives. In one alternative the master device wirelessly receives the at least one acoustic signal recorded by the one or more other devices. From here the master device can mix all the channels itself including the channel(s), if any, registered to itself that the master device recorded, or it can forward them all on to another entity such as a web server to do the mixing. In other embodiments any of the devices, master or otherwise, can collect the acoustic signals recorded by the other devices. The other alternative at block 608 is the master device (if it is participating in the recording) and/or the other registered devices transmitting the recorded at least one acoustic signal to another entity such as a web server for mixing. In this latter embodiment, if the master device has not also received/collected the individual recorded channels from the other devices then the other devices can also send their recorded acoustic signals directly to the web server for mixing.

In one embodiment not particularly summarized at FIG. 6, the master device also registers the one or more other devices to one or more video channels, and can again indicate relative positions of the other devices for simultaneously recording the different video channels. This indication on the master device's or other device's graphical user interface may be a simple L or R indication for the video channel.

In another embodiment detailed above, registering the one or more other devices to one or more audio channels further comprises attributing to the respectively registered microphones/devices a selected one of a directional polar pattern and an omni-directional (non-directional) polar pattern, to record the different audio channels. This attributing may be in the operating program only and not displayed on the graphical user interface.

In a still further embodiment, the at least one recorded acoustic signal that is collected at the master device at least from the one or more other devices as stated at block 608 further includes the master device mixing the received/collected at least one acoustic signal (with the signal if any that was recorded at the master device) into a stereo audio file, or a surround sound file, or some other type of multi-channel sound/audio file. Or in a different embodiment the at least one recorded acoustic signal is transmitted by the registered devices which recorded it to a web server for mixing into a stereo audio file or a surround sound file or some other type of multi-channel sound/audio file.

Figure 7:
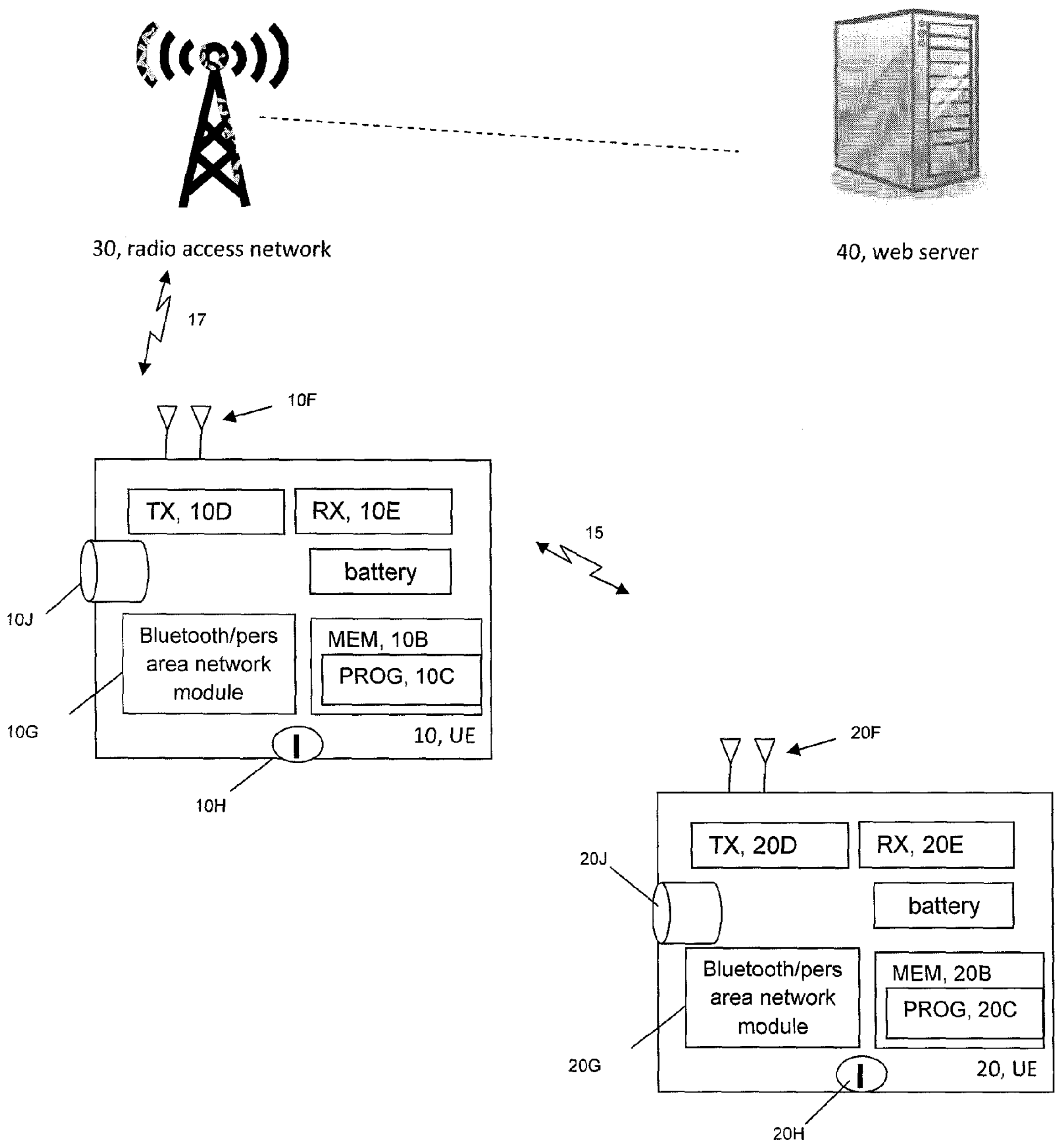
FIG. 7 is a schematic block diagram of one of the devices participating in a joint recording and which is also in wireless contact with another device and with a web server, and illustrate different apparatus which can be used for embodying the teachings set forth herein.

The master device and the other participating devices may for example be implemented as user mobile terminals or more generally as user equipments UEs. FIG. 7 illustrates by schematic block diagrams of a master device implemented as a user equipment UE 10, one slave device implemented as another UE 20, a radio access network 30 and a web server 40 on the Internet. The master UE 10 and slave UE 20 are wirelessly connected over a bidirectional wireless link 15, and the master device 10 is in bi-directional wireless communication with the radio access network 30 via link 17. While only one wireless link 15, 17 is shown for each, there may be more in which each link 15, 17 represents multiple logical and physical channels.

The UE 10 includes a controller, such as a computer or a data processor (DP) 10A, a computer-readable memory (MEM) 10B that stores a program of computer instructions (PROG) 10C such as the software application detailed in the various embodiments above, and a suitable radio frequency (RF) transmitter 10D and receiver 10E for bidirectional wireless communications over the various wireless links 15, 17 via one or more antennas 10F (two shown). The UE 10 is also shown as having a Bluetooth or other personal area network module 10G, whose antenna may be inbuilt into the module. The master UE 10 additionally may have one or more microphones 10H and in some embodiments also a camera 10J. All of these are powered by a portable power supply such as the illustrated galvanic battery.

The slave device 20 also includes a controller/DP 20A, a computer-readable memory (MEM) 20B storing a program of instructions (PROG) 20C/software application, and a suitable radio frequency (RF) transmitter 20D and receiver 20E for bidirectional wireless communications over the various wireless links 15, 17 via one or more antennas 20F. The slave UE 20 also has a Bluetooth or other personal area network module 20G, and one or more microphones 20H and possibly also a camera 20J, all powered by a portable power source such as a battery.

At least one of the PROGs in the master and in the slave UE 10, 20 is assumed to include program instructions that, when executed by the associated DP, enable the device to operate in accordance with the exemplary embodiments of this invention, as detailed above. That is, the exemplary embodiments of this invention may be implemented at least in part by computer software executable by the DP of the UE 10, 20, or by hardware, or by a combination of software and hardware (and firmware).

In general, the various embodiments of the UE 10, 20 can include, but are not limited to, cellular telephones, personal digital assistants (PDAs) having wireless communication and at least audio recording capabilities, portable computers having wireless communication and at least audio recording capabilities, image and sound capture devices such as digital video cameras having wireless communication capabilities, music capture, storage and playback appliances having wireless communication capabilities, Internet appliances permitting wireless Internet access and browsing as well as at least audio recording, and other portable units or terminals that incorporate combinations of such functions.

The computer readable MEM in the UE 10, 20 may be of any type suitable to the local technical environment and may be implemented using any suitable data storage technology, such as semiconductor based memory devices, flash memory, magnetic memory devices and systems, optical memory devices and systems, fixed memory and removable memory. The DPs may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in embodied firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, embodied software and/or firmware, special purpose circuits or logic, general purpose hardware or controller or other computing devices, or some combination thereof, where general purpose elements may be made special purpose by embodied executable software.

It should thus be appreciated that at least some aspects of the exemplary embodiments of the inventions ma y be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, and circuitry described herein by example.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

I claim:

1. A method comprising:

registering at a master device one or more other devices associated with one or more audio channels for recording at least one acoustic signal from one or more sound sources;

recording the at least one acoustic signal using at least one of the master device and one or more other devices based on position of the one or more other devices relative to the master device, in which the position is received at the master device via manual entry or via wireless signaling from the one or more other devices, wherein the at least one recorded acoustic signal is either:

collected by at least one of the master device and the one or more other devices, or transmitted to another entity by at least one of the master device and the one or more other devices; and wherein registering the one or more other devices further comprises attributing a user-selected one of a directional polar pattern and an omni-directional polar pattern for each different other device and the master device to record the at least one acoustic signal based on the user-selected polar pattern.

2. The method according to claim 1, wherein the at least one acoustic signal comprises at least one audio-video signal and registering at the master device further comprises associating the one or more other devices with one or more audio and video channels for recording the at least one audio-video signal from different ones of the audio and video channels;

the method further comprising providing a synchronization signal from the master device for the one or more other devices to record their respectively registered audio and video channels.

3. The method according to claim 1, wherein the at least one recorded acoustic signal is collected by the master device from at least the one or more other devices, and the method further comprises mixing at the master device the collected at least one recorded acoustic signal with the at least one acoustic signal recorded at the master device into a multi-channel sound file.

4. The method according to claim 1, wherein the at least one recorded acoustic signal is transmitted to another entity which comprises a web server for mixing into a multi-channel sound file.

5. The method according to any claim 1, further comprising indicating relative positions of the registered one or more other devices on a graphical user interface of the master device which comprises a mobile terminal.

6. The method according to claim 1, wherein registering comprises randomly associating the one or more other devices to different audio channels.

7. The method according to claim 1, further comprising the master device assigning different audio channels to the master device and to the one or more other devices.

8. The method according to claim 7, wherein at least one of the master device and the one or more other devices is assigned respective different audio channels for recording the at least one acoustic signal at corresponding different microphones of the respective devices.

9. An apparatus comprising:

at least one processor; and a memory storing a program of computer instructions;

in which the processor is configured with the memory and the program to cause an apparatus to:

register at a master device one or more other devices associated with one or more audio channels for recording the at least one acoustic signal from one or more sound sources;

record at least one acoustic signal using at least one of the master device and one or more other devices based on position of the one or more other devices relative to the master device, in which the position is received at the master device via manual entry or via wireless signaling from the one or more other devices, wherein the at least one recorded acoustic signal is either:

collected by at least one of the master device and the one or more other devices, or transmitted to another entity by at least one of the master device and the one or more other devices; and wherein registering the one or more other devices further comprises attributing a user-selected one of a directional polar pattern and an omni-directional polar pattern for each different other device and the master device to record the at least one acoustic signal based on the user-selected polar pattern.

10. The apparatus according to claim 9, wherein the at least one acoustic signal comprises at least one audio-video signal and registering at the master device further comprises associating the one or more other devices with one or more audio and video channels for simultaneously recording the at least one audio-video signal; and the processor is configured with the memory and the program to cause the apparatus to further cause the apparatus to provide a synchronization signal from the master device for the one or more other devices to record their respectively registered audio and video channels.

11. The apparatus according to claim 9, wherein the at least one recorded acoustic signal is collected by the master device from at least the one or more other devices, and the processor is configured with the memory and the program to cause the apparatus to further cause the apparatus to mix at the master device the collected at least one recorded acoustic signal with the at least one acoustic signal recorded at the master device into a multi-channel audio file.

12. The apparatus according to claim 9, wherein the at least one recorded acoustic signal is transmitted to another entity which comprises a web server for mixing into a multi-channel audio file.

13. The apparatus according to claim 9, in which the processor is configured with the memory and the program to cause the apparatus further to indicate relative positions of the registered one or more devices on a graphical user interface of the master device which comprises a mobile terminal.

14. The apparatus according to claim 9, in which the processor is configured with the memory and the program to cause the apparatus to register the one or more other devices by randomly associating the one or more other devices to different audio channels.

15. The apparatus according to claim 9, in which the processor is configured with the memory and the program to cause the apparatus to assign different audio channels to the master device and to the one or more other devices.

16. The apparatus according to claim 15, wherein at least one of the master device and one or more other devices is assigned two different audio channels for recording the at least one acoustic signal at corresponding different microphones of the said device.

17. A computer-readable memory storing non-transitory computer readable instructions which when executed by at least one processor result in actions comprising:

registering at a master device one or more other devices associated with one or more one or more audio channels for recording at least one acoustic signal from one or more sound sources;

recording the at least one acoustic signal using at least one of the master device and one or more other devices based on position of the one or more other devices relative to the master device, in which the position is received at the master device via manual entry or via wireless signaling from the one or more other devices, wherein the at least one recorded acoustic signal is either collected by at least one of the master device and the one or more other devices, or transmitted to another entity by at least one of the master device and the one or more other devices; and wherein registering the one or more other devices further comprises attributing a user-selected one of a directional polar pattern and an omni-directional polar pattern for each different other device and the master device to record the at least one acoustic signal based on the user-selected polar pattern.

18. The computer-readable memory according to claim 17, wherein the at least one acoustic signal comprises at least one audio-video signal and registering at the master device further comprises associating the one or more devices with one or more audio and video channels for recording the at least one audio-video signal; and the actions further comprise providing a synchronization signal from the master device for the one or more other devices to record their respectively registered audio and video channels.

* * * * *